(12) United States Patent
Simpson et al.

(10) Patent No.: US 7,315,390 B2
(45) Date of Patent: Jan. 1, 2008

(54) IDENTITY-BASED IMAGING INBOUND FACSIMILE SERVICE

(75) Inventors: Shell S. Simpson, Boise, ID (US); Ward S. Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 939 days.

(21) Appl. No.: 10/226,004

(22) Filed: Aug. 21, 2002

(65) Prior Publication Data

US 2004/0036907 A1 Feb. 26, 2004

(51) Int. Cl.
*G06F 3/12* (2006.01)
*G06K 15/00* (2006.01)

(52) U.S. Cl. .................... 358/1.15; 358/1.16; 358/403

(58) Field of Classification Search ............... 358/1.15, 358/402, 403, 407, 1.16, 1.17, 1.1, 404, 444, 358/468; 709/219, 203; 726/3; 379/100.01, 379/100.08; 707/1, 2, 3, 10, 204
See application file for complete search history.

(56) References Cited

U.S. PATENT DOCUMENTS

| | | | | |
|---|---|---|---|---|
| 5,701,183 A * | 12/1997 | Bellemare et al. | .......... | 358/404 |
| 5,978,477 A * | 11/1999 | Hull et al. | .................. | 358/403 |
| 6,046,824 A * | 4/2000 | Barak | .......................... | 358/400 |
| 6,684,368 B1 * | 1/2004 | Hull et al. | .................. | 715/500 |
| 6,957,235 B2 * | 10/2005 | Peairs et al. | ................ | 707/204 |

\* cited by examiner

*Primary Examiner*—Dov Popovici (57) ABSTRACT

A method and systems for saving a facsimile message to a personal image repository as a facsimile image in a format compatible with multiple computer operating systems for use with an identity-based imaging system.

18 Claims, 3 Drawing Sheets

IDENTITY-BASED IMAGING INBOUND FACSIMILE SERVICE

FIELD OF THE INVENTION

The present invention relates to a system and methods for storing facsimile messages for later use. Particularly, the present invention relates to the storage of a facsimile message as an image in a format compatible with multiple computing platforms and operating systems wherein the image is stored in a personal image repository unique to an individual for use with an identity-based imaging system.

BACKGROUND OF THE INVENTION

Facsimile transmission is a widely used method of personal and business communication. The facsimile communication process advantageously allows messages, documents and images to be transmitted between remotely located senders and recipients.

Facsimile machines traditionally operate by measuring and recording the light and dark areas (in the form of pixels) on a hard copy of a document with an optical scanner. These light and dark areas are processed into a binary image file and then compressed for transmission by one of a variety of source encoding techniques using source compression algorithms. The digital representation of the document image is then typically transmitted over the public switched telephone network (PSTN) using a voice-band modem, the modem converting the digital files into analog signals capable of traveling over phone lines. At the receiving end, a modem associated with a receiving facsimile machine reconverts the analog signal back into a digital file, whereupon the digital file is decompressed into the original binary file format. The receiving facsimile machine then translates the binary file into an image that can be printed by the receiving facsimile machine.

Alternatively, a computer may operate as a "fax machine" by employing special translation software that converts a document from and to a facsimile transmission format. Using a modem and a PSTN for transmission, users at properly configured computers can send and receive facsimile images.

With respect to conventional facsimile machines (and computer-based faxing), the receiving machine may be unavailable if turned off or if the telephone line to which it is attached is busy. Additionally, images may be garbled or otherwise corrupted in transmission by telephone line problems or by paper jams in the receiving facsimile machine. Also, long distance connections between transmitting facsimile machines often require expensive communication charges. Finally, many users only have limited access to facsimile machines, as many households do not have a facsimile machine and many businesses typically only have a single facsimile machine. Thus, facsimile transmission between conventional facsimile machines is not optimized in terms of accuracy of message transmission and convenience of use.

Recently, facsimile machines have been developed which are e-mail enabled, thus offering alternative methods for sending and receiving images scanned by a facsimile machine.

In the new breed of Internet facsimile machines, certain of the features of e-mail and faxing are advantageously combined. Internet facsimile machines are configured to be installed in a local area network (LAN), where the Internet facsimile machines are assigned an e-mail address and function as network devices. Generally, Internet facsimile machines work by scanning a document image into a binary file, and then packaging the data as attachments to an e-mail to be sent to a specified e-mail address in the manner previously described. The specified e-mail address may be the address of a computer user or may be the address of another Internet facsimile machine. In either case, the received attachment of the e-mail can be opened, viewed, forwarded, printed and the like. Exemplary Internet facsimile machines include the Okifax® 5950 series, available from Oki Data Americas, Inc., the Panasonic DX-2000, available from Panasonic, Inc., and the HP Digital Sender 8100C, available from Hewlett Packard, Inc. Most Internet facsimile machines are also configured for sending facsimile messages in a conventional manner over a PSTN.

In a further hybrid of conventional e-mail and facsimile techniques, a large number of companies now provide fax-to-e-mail or e-mail-to-fax services. Persons subscribing to such services are typically provided with a unique telephone number and an e-mail account that serve as proxies for receiving and sending faxes. The telephone number may be a local phone number, a long distance number, a toll-free number, or the like, which may be published or otherwise provided by a subscriber to the service. Using the fax-to-e-mail service, a conventional dial-up facsimile machine may send analog transmissions through the PSTN to the subscriber's unique phone number associated with the service. Upon receipt of the facsimile transmission at the service, the facsimile transmission is converted to a digital file, compressed (usually to a Tagged Image File Format (TIFF)), and associated with the subscriber's e-mail address as an attachment to a service-generated e-mail. The resulting e-mail is then automatically forwarded over the Internet, typically via Simple Mail Transfer Protocol (SMTP), directly to the subscriber's e-mail inbox. The subscriber may then retrieve the e-mail like any other e-mail message on the subscriber's computer workstation. To open the retrieved e-mail and view the contents, an image viewer compatible with the format of the transmitted file is required.

Facsimile messages received in the traditional manners herein described are usually viewed once and printed or otherwise converted to a hardcopy format. Archival copies, if made, are usually kept as paper copies and are only reproduced by traditional copying methods. Heretofore, no common storage system for saving and re-using facsimile messages has been developed.

While fax-to-e-mail services provide great flexibility in that subscribers can receive a facsimile transmission at any time and at any place by simply logging into their e-mail account from a personal computer, methods have not yet been developed for sharing such facsimiles across multiple platforms. More particularly, facsimile and image-based techniques have not been developed for conveniently storing, viewing and manipulating a facsimile as an image from an accessible storage location across different computing platforms. Therefore, it may be desirable to provide systems and methods for using a facsimile transmission and an imaging system unique to a user to meet various document handling needs.

BRIEF SUMMARY OF THE INVENTION

The present invention relates to a system and method for converting facsimile messages to images that may be stored in a personal image repository associated with an individual for use with identity-based imaging systems.

An identity-based imaging system as used with the present invention is a system capable of retrieving images associated with a user of the identity-based imaging system from a general location or storage. An identity-based image system may include executable code or instructions of a general or generic nature that require specific information about a user to be operative. For instance, an identity-based imaging system may include general instructions for retrieving a list of available images from a storage location wherein the storage location is undefined within the instructions. Additional instructions included with the identity-based imaging system retrieve information about a user of the identity-based imaging system and use the user information to fill in the storage location information during the execution of the retrieval instructions. Thus, the general instructions are customized to the particular user based upon user information retrieved by the identity-based imaging system.

In the various embodiments of the present invention a facsimile message received either as an electronic file or a hardcopy may be converted to an image and stored to a personal image repository for viewing across multiple computing platforms and operating systems. Once stored, an image from a personal image repository may be accessed by identity-based imaging systems such that the stored images may be used with the identity based imaging system.

The present invention involves the receipt of a facsimile message in a manner known in the art. A received facsimile message is converted to an image and stored electronically as a digital or other image. The storage format for the facsimile image is one that may be used across multiple computing platforms and operating systems. For instance, a facsimile image may be stored in a "PDF" or Portable Document Format. The converted facsimile image is stored in a personal image repository associated with the user storing the facsimile image. User information, such as log-in information for a computer network or system includes information describing the location of a personal image repository for the user or may be used to calculate or determine the location of a personal image repository associated with the user. Once converted, the facsimile image may be stored in the user's personal image repository. The images stored in the user's personal image repository may be accessed by the user or accessed by an identity-based imaging system and used to across multiple computing platforms.

BRIEF DESCRIPTION OF THE SEVERAL VIEWS OF THE DRAWINGS

While the specification concludes with claims particularly pointing out and distinctly claiming that which is regarded as the present invention, the present invention can be more readily ascertained from the description of the invention when read in conjunction with the accompanying drawings in which:

DETAILED DESCRIPTION OF THE INVENTION

The present invention relates to the use of an identity-based imaging service with facsimile messages. More particularly, the present invention stores images of facsimile messages associated with a particular user in a personal image repository where the stored images may be used or manipulated with identity-based imaging systems or services operating across various networks, computer systems or the Internet.

An identity-based imaging system or service according to the present invention includes a service capable of accessing data or image files that are unique to an individual user based upon information about the user. The identity-based imaging system identifies a user based upon user information provided by a device or computing system being used by the user to access the identity-based imaging system. Based upon the user's information, the identity-based imaging system may access a personal image repository associated with the user and retrieve images from the personal image repository for use with the identity-base imaging service. A personal image repository is a storage location that includes a dynamic set of storage location, servers, and services associated with a unique user that may be used to store images created and stored in a format that may be read or used across multiple computing platforms. The personal image repository is associated with a user based upon a profile of the user or other user information that is unique to an individual user. Personal imaging repositories and identity-based imaging are further described in commonly assigned United States Patent Application entitled "Systems and Methods for Distributing Imaging Information Using Network-Based Imaging Techniques," which is incorporated herein by reference.

In the various embodiments of the present invention, a user receives a facsimile message, converts the message to an image if necessary, and stores or associates one or more portions of the message with a personal image repository associated with the user. The image is stored in a format allowing the image to be viewed, or otherwise used, across multiple platforms. The user may retrieve a copy of the stored image from their personal image repository using any computing platform at any time, thus making the stored facsimile image available to the user on-demand. This is particularly powerful when using web applications (applications running on a server that exposes their user interface through web pages). Through the user's personal imaging repository, a web application can access a stored image, combine that stored image with other stored images, and otherwise use the stored image.

The methods involved in preparing a facsimile message for storage to a personal imaging repository for use with an identity-based imaging service may vary depending upon the format of the original facsimile message. For instance, traditional facsimile messages are received by a fax machine and automatically converted to a hardcopy format, such as being printed on a piece of paper. To convert the facsimile message into an image file capable of being used with an identity-based imaging system, the hardcopy must be scanned or otherwise reproduced as a digital file or data file that may be stored in electronic or other storage media as an image. Typical image storage formats that may be used to store images include TIFF (Tagged Image File Format), JPEG (Joint Photographic Experts Group), GIF (Graphical Image Format), and PDF (Portable Document Format) file formats. A facsimile hardcopy may be converted to a single image file for storing imaging information for a single page or for multiple pages. Alternatively, each page of a facsimile hardcopy may be converted to individual image files for storage. Once converted, the image file or files may be transferred or saved to a personal imaging repository associated with the user.

More recently, facsimile messages are received and stored as data files or as images. For instance, a computer user may send a document as a facsimile message from a first computer to a second computer. Upon receipt, the second computer stores the facsimile message as a data file until such time that a user of the second computer desires to view the stored facsimile. In the context of the present invention, the stored facsimile data file may be transferred to a personal image repository associated with the recipient of the facsimile or user. If conversion of the file format of the stored facsimile message is necessary to create an image capable of being viewed across multiple computing platforms in an identity-based imaging system, conversion may be performed prior to transferring the file to the personal image repository.

In other instances, facsimile messages are sent via e-mail or are deposited in a web-based repository associated with a domain name. E-mailed facsimiles are usually stored as image files that may be transferred to a personal image repository as-is or after conversion to the necessary format for use with an identity-based imaging system. Facsimile messages stored by web-based repositories are usually stored as image files for facilitating viewing with a web-browser. Therefore, a facsimile message stored as an image file within a web-based repository may be downloaded or otherwise transferred to a personal image repository associated with a user for later use with an identity-based imaging system.

Figure 1:
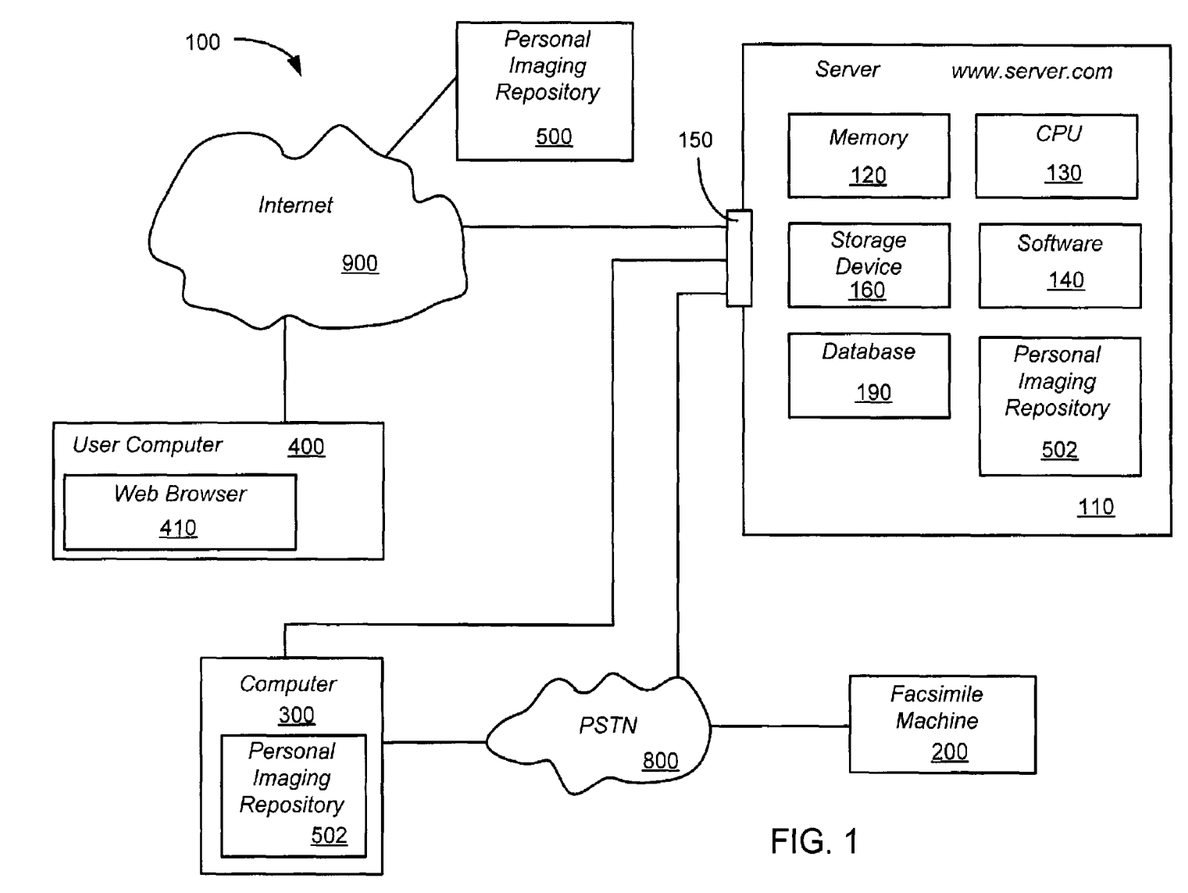
FIG. 1 illustrates a block diagram of various components that may be used with the identity-based imaging system of the present invention.

A system that may be used for carrying out the various embodiments of the present invention is illustrated in FIG. 1. The system 100 may include a server 110 connected to, or able to communicate with, the Internet 900 and/or a public switched telephone network 800 (PSTN). One or more facsimile machines 200 may be connected to, or in communication with, a PSTN 800 for sending and receiving facsimile messages. One or more computers 300 may also be connected to, or in communication with, a PSTN 800 for sending facsimiles or with Internet 900 for sending e-mail facsimiles. A user computer 400 may be equipped with an Internet 900 connection and a web browser 410 for accessing data from the Internet 900 and/or viewing data stored on remote computers such as server 110. A personal image repository 500 may be associated with Internet communications. Alternatively, a personal image repository 502 may be associated with a computer such as a server 110 or computer 300.

Server 110 may include any computer system commonly associated with computer servers or network computing systems as known. To perform necessary functions, server 110 may include one or more central processing units 130 (CPU), one or more memories 120 for storing data, one or more executable software programs 140 for carrying out various tasks and performing various functions, one or more storage devices 160, and one or more communication ports 150. Server 110 may also include one or more databases 190 stored in a memory 120 or on a storage device 160 accessible to said server 110.

Facsimile machine 200 may include any facsimile machine conforming to the Group 3 Standard and capable of sending facsimiles. Alternatively, facsimile machine 200 may include any device incorporating facsimile capabilities, such as a multifunction device, computer system or the like.

Computers 300 may include computing systems capable of sending and/or receiving facsimiles through a PSTN 800 connection or through an Internet 900 connection. Typically, a computer 300 may be configured to send and/or receive facsimiles includes one or more software and/or hardware components for constructing, sending, and receiving facsimiles in accordance with Group 3 Standards or in accordance with other facsimile standards. The use of computers 300 to send and receive facsimiles in this manner is known. Computer 300 may also include capabilities for sending and receiving facsimile messages via e-mail.

User computer 400 may include any computing system wherein a user may access a web browser 410 for surfing, or otherwise exploring, the Internet 900 or an intranet/extranet. A web browser 410 stored on computer 400 may be executed to view particular data stored on a remote computer operating a web server. For instance, the web browser 410 of computer 400 may be used to view data stored in a memory 120 of server 110 where server 110 may be associated with a uniform resource locator (URL), such as "www.server.com." Using web browser 410, a user may submit the URL "www.server.com" to the web browser 410, causing web browser 410 to link to the server 110, retrieve data stored in a memory 120 and display the data, or an image created by the data, in the web browser 410. The use of web browsers 410 to retrieve and view data stored by remote systems accessible to the Internet 900 is known.

Figure 2:
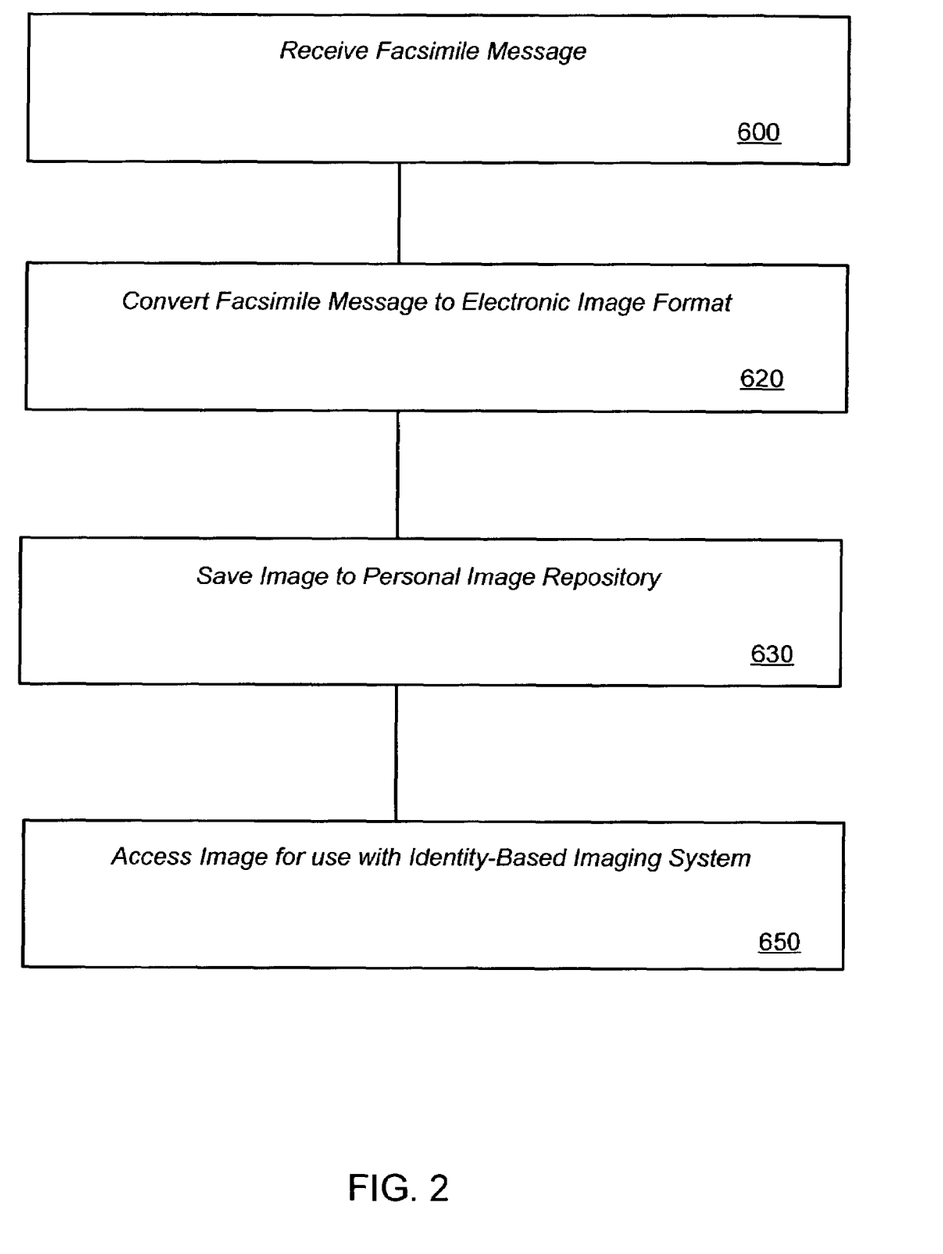
FIG. 2 illustrates a block diagram of steps that may be used to carry out the various embodiments of the present invention.

In the various embodiments of the present invention a facsimile message is converted to an image that may be stored in a personal image repository associated with the recipient of the facsimile message. Once stored to the personal image repository, a user may access the facsimile message image for use with computing systems or image-based identity systems for creating media or documents. A number of steps or actions may occur to deposit an image of a facsimile into a personal image repository for access by a user. A block diagram of some of the steps or actions is illustrated in FIG. 2. Although FIG. 2 illustrates some steps that may be involved with the various aspects of the present invention, it is understood that other steps or actions may also occur which are also encompassed by the present invention.

Initially, a recipient must receive a facsimile message 600. Received facsimile messages may include facsimile messages received as a hardcopy facsimile message, an electronic copy sent to a computer or attached to an e-mail, or a facsimile message deposited in a repository such as a web-based facsimile repository service. Once received, the facsimile message may be converted to an electronic image file 620 having a format that may be easily viewed, manipulated, or understood across multiple computing platforms. Alternatively, the electronic image file may remain in any form and be converted to the desired form dynamically by personal image repository 500 when requests for that electronic image file are made. These requests would include an identification of the desired file format to which the electronic image file is to be converted. The image file of the facsimile message may then be saved to a personal image repository 630 associated with a user desiring to save the facsimile message. Once saved, a user may access the facsimile image for use with an identity-based imaging system 650. For instance, a user may wish to transmit a copy of a facsimile message that they received and stored to their personal image repository to a friend. Using an identity-based imaging system configured for sending e-mail, the user could attach a copy of the facsimile image from their personal image repository to the e-mail and thereby transmit the facsimile to their friend. Use of the personal imaging repository with an identity-based imaging system is further explained herein.

The conversion of a facsimile message to an electronic image file 620 having a format compatible with multiple computing platforms may include conversion of a facsimile message to an image file having a PDF format. "PDF" is an acronym for "Portable Document Format" and is an imaging format developed and commercialized by Adobe®. Use of PDF file formats for saving facsimile message images to personal repositories associated with the present invention may be desired because PDF files may typically be viewed across multiple platforms or operating systems such as Windows®, Apple®, LINUX, and UNIX operating systems and platforms. Other image file formats compatible with multiple platforms and operating systems may also be used to store facsimile message images to a personal imaging repository.

Before saving a facsimile image to a personal image repository, the facsimile image must be associated with a user. A personal image repository of the present invention includes a portion of a storage medium that is uniquely associated with a particular user. Stated more broadly, a personal image repository is the dynamic set of images, storage, services, and machines that store or provide access to imaging information that is associated with a particular user. Data on a remote server can be associated with the personal imaging repository of a user by referencing the data to the personal imaging repository. Once data has been referenced to the personal imaging repository, a user may access the data from the personal imaging repository. For instance, a hard drive, a memory, or an optical storage device may be used to store personal image repositories for a number of users having access to a particular network system. Each personal image repository is associated with a unique user by such things as a user profile or information used to identify a user of the network. The personal image repositories may only be accessed by a user associated with the personal image repository or by a service acting on behalf of a user that has been granted permission to do so by the user. For example, a user of computer 400 may have a facsimile image stored in a memory of computer 400 that they wish to save to their personal image repository 500. To do so, the user may execute a command or program resident or remote to computer 400 that acquires the facsimile image and the user's unique information, such as a user profile, from computer 400. The command or program then communicates with the personal image repository 500 and identifies the user's particular personal image repository according to the user profile. Once found, the facsimile image may be stored in the user's personal image repository for later retrieval and use.

Figure 3:
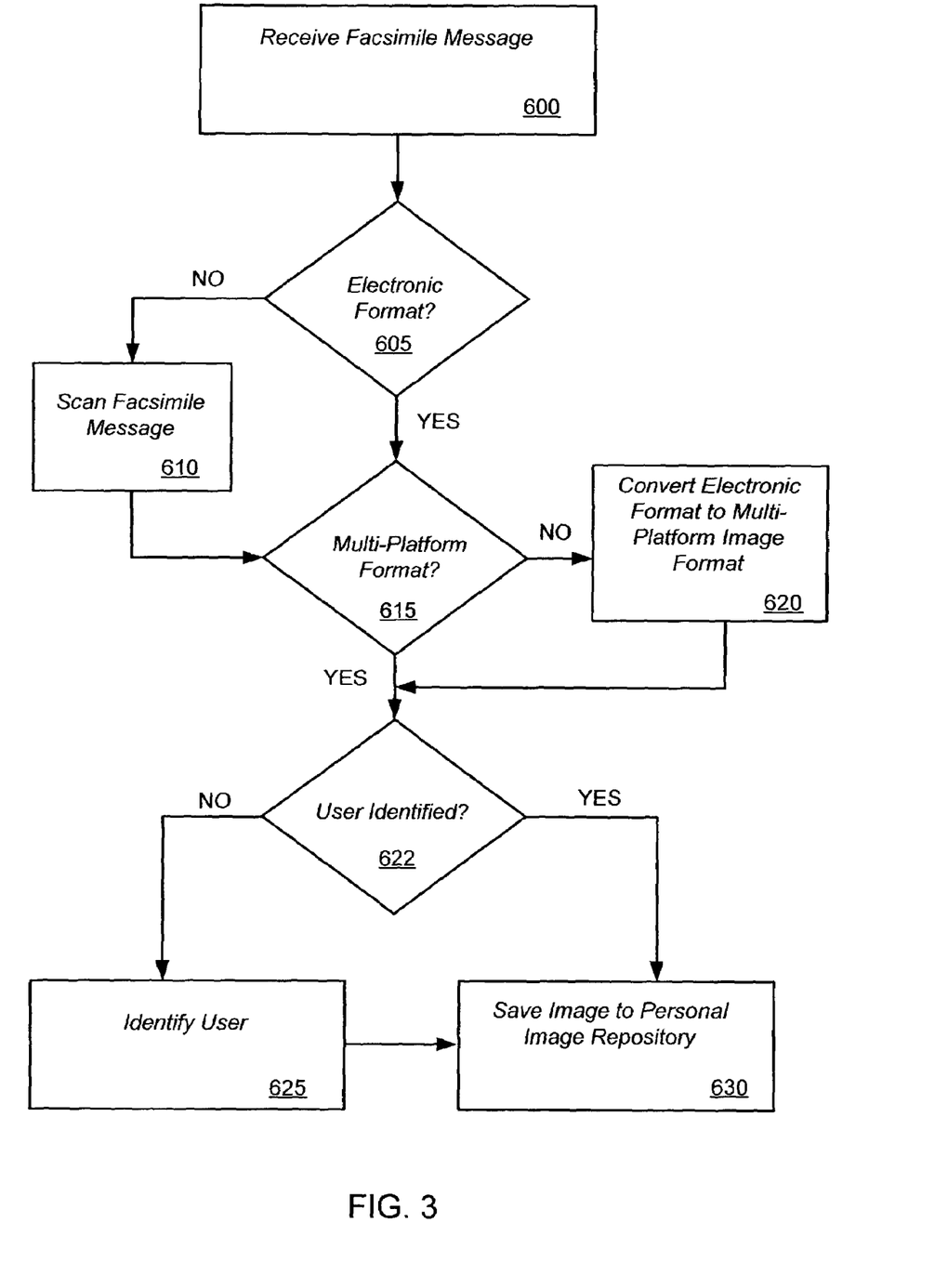
FIG. 3 illustrates a block diagram of steps that may be used to carry out the various embodiments of the present invention.

A more detailed flow chart of some steps that may be involved in retrieving, converting and storing a facsimile message according to the identity-based facsimile imaging system of the present invention is illustrated in FIG. 3. Upon receiving a facsimile message 600 it may be determined whether or not the facsimile message is in an electronic format 605. If the facsimile message is not in an electronic format, it may be converted to an electronic format using a method such as by scanning the facsimile message 610. Once in an electronic format, it is determined whether or not the electronic format is a multi-platform format 615 image file that may be shared across multiple computing platforms. The present invention may be configured to automatically convert electronic files in non-multi-platform formats to multi-platform image formats 620 for storage to a personal imaging repository. Alternatively, the electronic format of the facsimile message may be saved and converted at a later time. Once the facsimile image is in the proper format for storage to a personal image repository, the user must be identified 622. If the user is known, the facsimile image is saved to a personal image repository 630 associated with the user. If the user is not known, the user must be identified 625 before the facsimile image may be saved to a personal image repository 630.

The various embodiments of the present invention involve the development of a facsimile image into an electronic format that may be shared across multiple computing platforms and the storage of the facsimile image to a personal image repository based upon the unique characteristics of a user. Facsimile messages stored in a personal image repository may be used with an identity-based imaging system and may be better understood with reference to a number of examples wherein the methods for saving facsimile images to a personal imaging repository, and the uses for those images, are described.

In one embodiment of the present invention, a user receives a hardcopy of a facsimile message and stores an image of the facsimile message to a personal image repository using a number of steps. A two-page facsimile message received at fax machine 200 is retrieved by a user. Using a scanner (not shown), or another imaging device for converting paper documents to electronic images, the user converts the hardcopy facsimile message into a single electronic image file including both pages of the facsimile. By default in the scanning software, the electronic image file may be saved in a JPEG or other format to a memory of computer 400. Although a single image file is described in this example, it is understood that the user may choose to convert a multi-page facsimile into multiple files that may be individually saved to a personal image repository. Desiring to save the image file in a personal image repository remote to computer 400 but accessible through the Internet 900, the user establishes rights to use computer 400. This process may include logging onto a network system or logging onto the computer 400 by providing user information to computer 400. User information may include a user name and personal identification number or security code as known. Once logged onto computer 400, the user may request storage of the image file to a personal image repository. A request for storage to a personal image repository may be executed with software or executable code resident in a memory of, or accessible to, computer 400. Alternatively, a request to store an image file with a personal image repository may be made to a remote location. For instance, the user, desiring to access a personal image repository, may utilize web browser 410 to surf to the personal image repository 500 where a number of options for interacting with personal image repositories may be available. Selecting to store an image in the personal image repository 500, the personal image repository may execute a set of instructions to retrieve the desired image for storage from computer 400 along with user information, such as log-in information. The user's information may then be used to determine the personal image repository in which the identified image is to be saved. If the retrieved image is not in the proper format, the executed instructions may convert the image file into an image file that may be used across multiple platforms or operating systems. Once saved, the user may disconnect from the personal image repository.

In another embodiment of the present invention, a facsimile message may be received as an electronic file and automatically stored in a user's personal image repository 500. Once received and stored, the facsimile message may be accessed from the personal image repository 500 by the associated user or other entity given access by the user. A facsimile received in such a manner may include a facsimile attached to an e-mail, a facsimile message received by a traditional facsimile machine, or any other type of facsimile.

The execution of code or instructions to save a facsimile image to a personal image repository triggers a number of events. First, the user executing the code is identified. A user profile used for logging into a computer or network system may be sufficient to identify the user. In other instances, a user may be prompted for additional information from which the personal image repository associated with the user may be identified. Because each user is unique, no two users will share a personal image repository. However, it is envisioned that personal image repositories shared by groups of individuals may be created and used in accordance with the present invention for saving facsimile images for multiple users. For instance, a personal image repository may be created to save facsimile images and other images created by a team of users for a particular project. In such a scenario, each user would have access to the personal image repository for the group.

Once a user is identified, the identification may provide generic executable code and instructions for saving the facsimile image to save the facsimile image to a certain path or location that is the location of the personal image repository. Where a user is not identified, the generic instructions would be unable to save a facsimile image because the desired personal image repository would not be identified. The user identification, therefore, provides the present invention the location or path for the personal image repository of the user. This path may include paths across multiple platforms or domains if the personal image repository is stored remotely to the user's computing system.

In another embodiment of the present invention, a user logged onto a computer 300 connected to a network system or server 110 receives an electronic copy of a facsimile message attached to an e-mail. The e-mail may be opened and the facsimile message viewed using various software packages as known. To save the facsimile message to a personal image repository, the user may first save the facsimile message as an electronic file in a memory of computer 300. An executable function residing on computer 300 may be initiated to convert the electronic file of the facsimile to a universal file format or format that is preferably used for saving images to the personal image repositories associated with the present invention. Alternatively, computer 300 may be used to retrieve an executable from server 110 or other networked computer for saving a facsimile image file to a personal image repository. Once the facsimile image file is converted to the proper format, the facsimile image is saved to a personal image repository associated with the user. In the instant case, each user logging onto computer 300 may have a personal image repository 502 stored on a storage device or in a memory of computer 300. Execution of the program or instructions to save the facsimile file to the personal image repository 502 stores the facsimile image in the personal image repository 502 stored on computer 300 associated with the user based upon the user's profile or log-in information.

In another embodiment of the present invention, a user may be notified of the receipt of a facsimile that is being stored with a facsimile service on a server 110 accessible using the Internet 900. Logging onto computer 400, the user may surf to the domain associated with server 110—"www.server.com"—to retrieve the facsimile from a memory of server 110. A request by the user to retrieve the facsimile prompts server 110 to transfer an electronic copy of the facsimile to computer 400. The electronic copy of the facsimile may be transferred for viewing in a web-browser 410 operating on computer 400 or directly to a storage device of computer 400. Executing instructions or code to save the facsimile to a personal image repository results in the instructions or code retrieving the user information to identify the location of the personal image repository; the conversion of the facsimile to a facsimile image for storage in the personal image repository; and the storing of the facsimile image to the personal image repository. Alternatively, a user may configure a service to automatically save facsimiles received by a facsimile service to the user's personal image repository 500 so that any viewing of the facsimile message may be conducted using the personal imaging repository 500.

Alternatively, the facsimile service may include executables to automate the retention of a facsimile image in a personal image repository. For instance, when a user accesses a facsimile stored by server 110 from a web-browser 410, the information passed to the web-browser may include a selectable link or command allowing the user to initiate the saving of the facsimile image to the user's personal image repository. If the link or command is selected, the server 110 may retrieve the user information from computer 400 through web-browser 410 and locate a personal image repository associated with the user's information. Once located, the server 110 may automatically convert the facsimile image to an image format compatible across multiple platforms and save the converted facsimile image to the personal image repository associated with the user information.

Images saved to a personal image repository may be retrieved by the user associated with the personal image repository at a later time. For example, a user may desire to create a hardcopy of a facsimile that they received the week prior that was stored in their personal image repository. The user may create the hardcopy using a printing service associated with an identity-based imaging system. Logging onto computer 400, a user may utilize web-browser 410 to surf to server 110 where a printing service associated with an identity-based imaging system is stored. Upon accessing the printing service, the printing service identifies the user by retrieving the user information used to access web-browser 410. The printing service has now identified the user and may search for a personal image repository associated with the user based upon the user's identification. The user information may indicate that the user's personal image repository 500 is located at a remote location. The printing service may connect to the personal image repository 500 using the user information and provide the user a list of images from the personal imaging repository to be printed in web-browser 410. The user may then select the desired facsimile image and the printing service retrieves the image form the personal image repository 500 associated with the user and prints the image.

In another example, an optical character recognition service may reside on server 100. Desiring to have a facsimile image that is stored in a personal image repository 500 converted to text, a user may surf to the optical character recognition service from web-browser 410 using computer 400. Upon receiving the request for a connection from web-browser 410, the optical character recognition service retrieves the user information associated with the user surfing to the service. This information may include the identification of the user and the location of their personal image repository 500. Utilizing the user information, the optical character recognition service automatically connects to the user's personal image repository 500 and retrieves the images that are available in the personal image repository 500 for selection by the user. A list of available images may be displayed to the user in web-browser 410. Using web-browser 410, the user may then select the image for conversion and request such conversion from the optical character recognition service. In this manner, the images stored in a user's personal image repository 500 may be retrieved for user by an identity-based imaging service across multiple platforms without instructions from the user.

Although the various embodiments of the present invention have been explained with respect to a computer system, the various embodiments may operate on other platforms such as with personal digital assistants, cell phones, portable computers, pagers, and the like. For instance, as the use of web-based technologies expands to other computing platforms a facsimile stored in a personal image repository may be accessed through an identity-based service operating on a cell phone or personal digital assistant based upon the profile of a user of the cell phone or personal digital assistant.

Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

What is claimed is:

1. A method for storing a facsimile message for use with an identity-based imaging system, comprising:
    receiving a facsimile message;
    converting said facsimile message to a facsimile image;
    obtaining user information for a recipient of the facsimile message;
    utilizing the obtained user information to identify a path to a personal image repository uniquely associated with the user information; and
    saving said facsimile image to the identified path.

2. The method of claim 1, wherein receiving said facsimile message comprises receiving said facsimile message on a device selected from be group consisting of a facsimile machine, a computer, and a web-based facsimile repository.

3. The method of claim 1, wherein said received facsimile is a hardcopy facsimile.

4. The method of claim 3, wherein converting said facsimile message to a facsimile image comprises:
    scanning said hardcopy facsimile into an image; and
    converting said image into a facsimile image having a format usable across multiple computer operating systems.

5. The method of claim 1, wherein said converting said facsimile message to a facsimile image comprises:
    creating a digital image of said facsimile message; and
    storing said digital image as said facsimile image.

6. The method of claim 1, wherein said identifying said path and saving said facsimile image to the identified path are performed automatically after receiving a facsimile.

7. The method of claim 1, further comprising viewing said facsimile image using the identified personal image repository.

8. The method of claim 7, wherein said viewing said facsimile image using said personal image repository comprises:
    accessing a web browser operatively connected to a web server for accessing the identified personal image repository;
    retrieving a facsimile image from the identified personal image repository; and
    downloading said facsimile image to said web browser for display.

9. The method of claim 1, further comprising providing a computing system for converting said facsimile message to a facsimile image and storing said facsimile image to the identified personal image repository.

10. The method of claim 9, wherein saving said facsimile image to the identified path comprises saving said facsimile image to the identified path wherein the identified path is a path to a personal image repository is remote to said computing system.

11. The method of claim 1, further comprising executing an identity-based imaging system for retrieving a facsimile image stored in the identified personal image repository.

12. A system for storing facsimile messages, comprising:
    a device configured to receive a facsimile message;
    a computing system configured to convert said facsimile message to a format for storage; and
    a personal image repository uniquely associated with user information; the personal image repository being configured to store facsimile messages converted by the computing system; and
    wherein the computing system is further configured to obtain user information for the recipient of the facsimile message, utilize the obtained user information to identify a path to the personal image repository, and save the converted facsimile image to the identified path.

13. The system of claim 12, wherein said device configured to receive a facsimile message comprises a device selected from the group consisting of a facsimile machine, a computer, and a web-based facsimile repository.

14. The system of claim 12, wherein said computing system comprises a computing system selected from the group consisting of a computer workstation, a networked computer, a server computer, a cell phone, a personal digital assistant, a pager, and a remote computer system.

15. The system of claim 12, wherein said personal image repository comprises a portion of a storage device selected from the group consisting of a hard disk, a floppy disk, an optical storage device, and a memory.

16. The system of claim 12, wherein said personal image repository is stored on a remote computing system.

17. A computer readable medium having computer executable code for saving a facsimile message to a personal image repository, the medium comprising:
- a conversion code for converting said facsimile message to a facsimile image format;
- an identification code for obtaining user information for a recipient of the facsimile message;
- a save code for utilizing obtained user information to identify a path to a personal image repository uniquely associated with said user information obtained by said identification code and saving said facsimile image to the identified path.

18. The computer readable medium of claim 17, wherein said computer readable medium is embedded in a device selected from the group consisting of a computer, a networked computer, a server computer, a remote computer, a cell phone, a personal digital assistant, a pager, and a portable computer.

* * * * *

UNITED STATES PATENT AND TRADEMARK OFFICE
CERTIFICATE OF CORRECTION

PATENT NO. : 7,315,390 B2
APPLICATION NO. : 10/226004
DATED : January 1, 2008
INVENTOR(S) : Shell S. Simpson et al.

It is certified that error appears in the above-identified patent and that said Letters Patent is hereby corrected as shown below:

In column 11, line 9, delete "100" and insert -- 110 --, therefor.

In column 11, line 64, in Claim 2, after "from" delete "be" and insert -- the --, therefor.

Signed and Sealed this

Twenty-seventh Day of May, 2008

JON W. DUDAS
*Director of the United States Patent and Trademark Office*